US011448309B2

(12) United States Patent
Jabido et al.

(10) Patent No.: US 11,448,309 B2
(45) Date of Patent: Sep. 20, 2022

(54) GEARED ARCHITECTURE GAS TURBINE ENGINE WITH PLANETARY GEAR OIL SCAVENGE

(71) Applicant: United Technologies Corporation, Farmington, CT (US)

(72) Inventors: Janice Jabido, Farmington, CT (US); Michael E. McCune, Colchester, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 174 days.

(21) Appl. No.: 16/785,915

(22) Filed: Feb. 10, 2020

(65) Prior Publication Data

US 2021/0222767 A1    Jul. 22, 2021

Related U.S. Application Data

(60) Provisional application No. 62/962,470, filed on Jan. 17, 2020.

(51) Int. Cl.
| | | |
|---|---|---|
| *F16H 57/04* | (2010.01) |
| *F01D 15/12* | (2006.01) |
| *F01D 25/18* | (2006.01) |
| *F02K 3/02* | (2006.01) |
| *F16H 1/28* | (2006.01) |
| *F16H 57/08* | (2006.01) |

(52) U.S. Cl.
CPC ......... *F16H 57/0427* (2013.01); *F01D 15/12* (2013.01); *F01D 25/18* (2013.01); *F02K 3/025* (2013.01); *F16H 1/28* (2013.01); *F16H 57/0442* (2013.01); *F16H 57/0479* (2013.01); *F16H 57/0486* (2013.01); *F16H 57/082* (2013.01)

(58) Field of Classification Search
CPC ............... F16H 57/0427; F16H 57/043; F16H 57/0442; F16H 57/0479; F16H 57/0482; F16H 57/0486; F16H 57/082; F16H 1/28; F01D 15/12; F01D 25/18; F02K 3/025; F05D 2240/126; F05D 2260/40311; F02C 7/06; F02C 7/36
See application file for complete search history.

(56) References Cited

U.S. PATENT DOCUMENTS

| | | |
|---|---|---|
| 5,472,383 A | 12/1995 | McKibbin |
| 5,851,163 A | 12/1998 | Kawase et al. |
| 9,038,779 B2 | 5/2015 | McCune et al. |

(Continued)

OTHER PUBLICATIONS

European Search Report for European Application No. 21152054.9 dated May 28, 2021.

*Primary Examiner* — Loren C Edwards
(74) *Attorney, Agent, or Firm* — Carlson, Gaskey & Olds, P.C.

(57) ABSTRACT

A fan drive gear system for a turbofan engine according to an exemplary embodiment of this disclosure, among other possible things includes a sun gear that is rotatable about an axis, a plurality of intermediate gears driven by the sun gear, and a baffle that is disposed between at least two of the plurality of intermediate gears for defining a lubricant flow path from an interface between the sun gear and at least one of the plurality of intermediate gears. The baffle includes a channel with at least one ramp portion directing lubricant.

12 Claims, 10 Drawing Sheets

(56) References Cited

U.S. PATENT DOCUMENTS

| | | |
|---|---|---|
| 10,247,020 B2 | 4/2019 | McCune |
| 10,287,915 B2 | 5/2019 | McCune |
| 2014/0106922 A1* | 4/2014 | Hancox ................ F02C 7/36 475/159 |
| 2015/0065285 A1* | 3/2015 | McCune ........... F16H 57/0482 475/159 |
| 2019/0271385 A1 | 9/2019 | Baraggia Au Yeung et al. |
| 2019/0301466 A1 | 10/2019 | Violet |

* cited by examiner

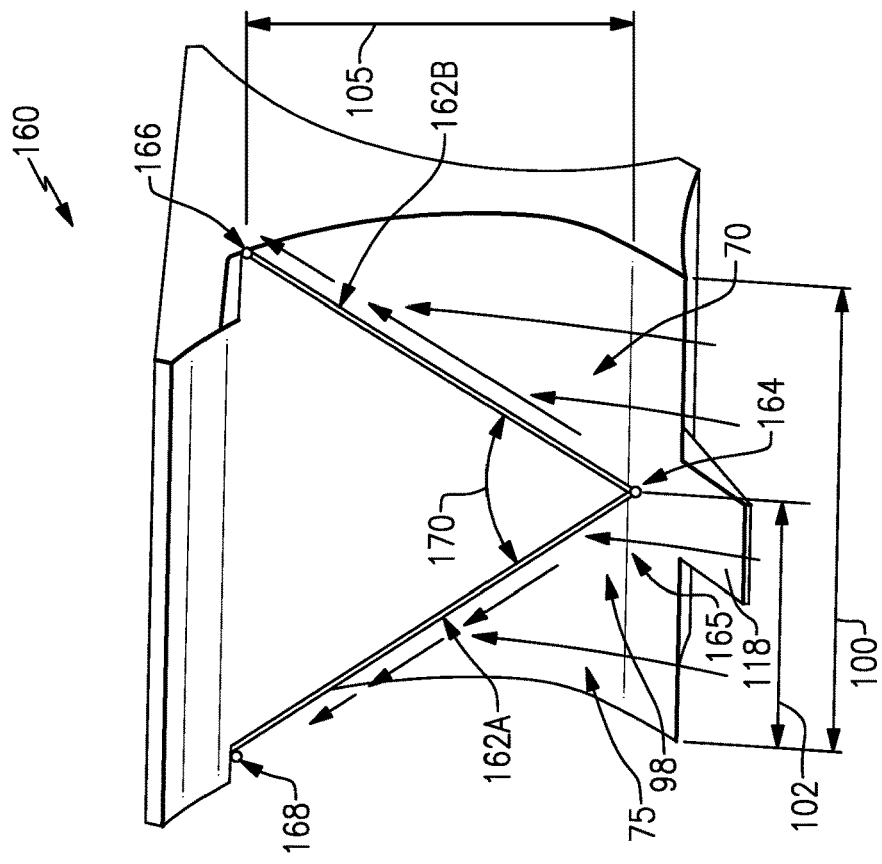
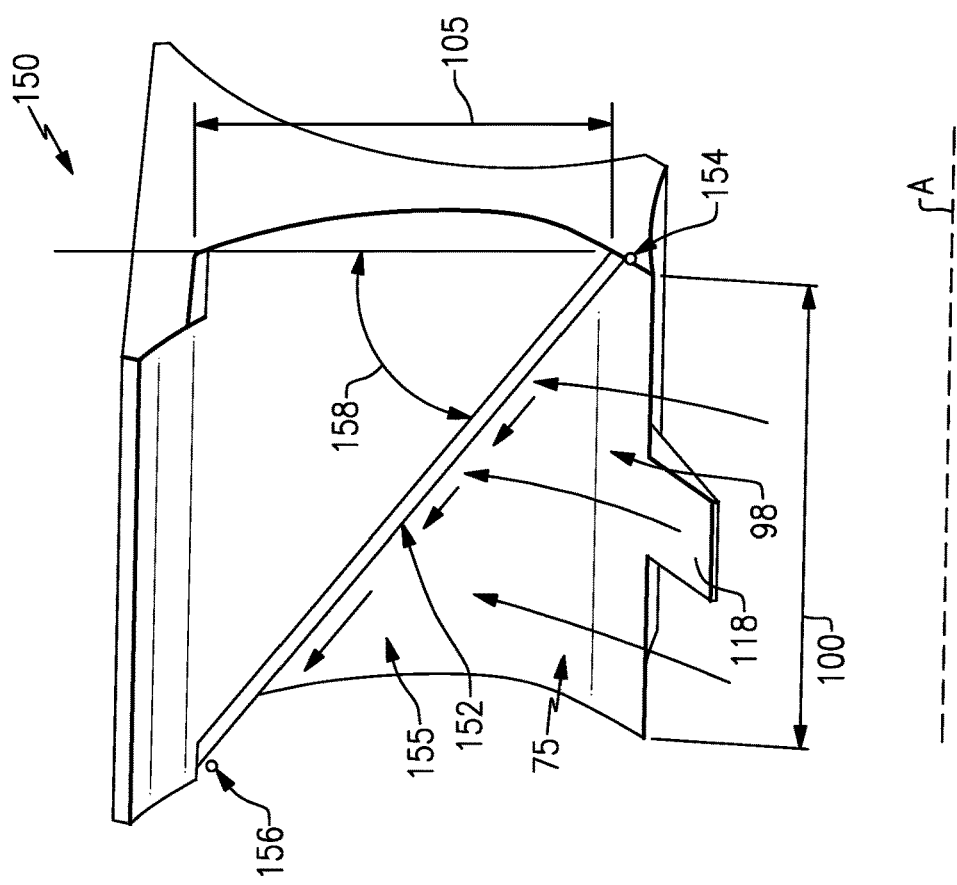
FIG.9
FIG.8

GEARED ARCHITECTURE GAS TURBINE ENGINE WITH PLANETARY GEAR OIL SCAVENGE

CROSS-REFERENCE TO RELATED APPLICATIONS

This application claims priority to U.S. Provisional Application No. 62/962,470 which was filed on Jan. 17, 2020, and is incorporated herein by reference.

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

A speed reduction device such as an epicyclical gear assembly may be utilized to drive the fan section such that the fan section may rotate at a speed different than the turbine section to increase overall propulsive efficiency of the engine. Lubricant flow through an epicyclical gear assembly is gathered and directed to a sump and/or auxiliary lubrication system. Efficient direction of oil through the gear assembly increases operational efficiencies.

Turbine engine manufacturers continue to seek further improvements to engine performance including improvements to thermal, transfer and propulsive efficiencies.

SUMMARY

A fan drive gear system for a turbofan engine according to an exemplary embodiment of this disclosure, among other possible things includes a sun gear that is rotatable about an axis, a plurality of intermediate gears driven by the sun gear, and a baffle that is disposed between at least two of the plurality of intermediate gears for defining a lubricant flow path from an interface between the sun gear and at least one of the plurality of intermediate gears. The baffle includes a channel with at least one ramp portion directing lubricant.

In a further embodiment of the foregoing fan drive gear system, the at least one ram portion directs lubricant forward.

In a further embodiment of the foregoing fan drive gear system, the at least one ramp portion directs lubricant aft.

In a further embodiment of the foregoing fan drive gear system, the at least two ramp portions include a first ramp portion that directs lubricant forward and a second ramp portion that directs lubricant aft.

In a further embodiment of any of the foregoing fan drive gear systems, the system includes a carrier that supports the intermediate gears and a ring gear that circumscribes the intermediate gears. The baffle is attached to the carrier and the carrier rotates about the axis.

In a further embodiment of any of the foregoing fan drive gear systems, the system includes a forward gutter forward of the carrier and an aft gutter aft of the carrier. The first ramp portion directs lubricant toward the forward gutter and the second ramp directs lubricant toward the aft gutter.

In a further embodiment of any of the foregoing fan drive gear systems, the baffle includes an inlet opening into the channel. The inlet is disposed radially inward of the first ramp portion and the second ramp portion.

In a further embodiment of any of the foregoing fan drive gear systems, the baffle includes an apex between the first ramp portion and the second ramp portion. The apex is disposed at a midpoint of an axial width of the channel to direct equal amounts of lubricant forward and aft.

In a further embodiment of any of the foregoing fan drive gear systems, the baffle includes an apex between the first ramp portion and the second ramp portion. The apex is spaced apart from a midpoint of an axial width of the channel to direct unequal amounts of lubricant forward and aft.

In a further embodiment of any of the foregoing fan drive gear systems, the apex is disposed at the inlet opening to the channel.

In a further embodiment of any of the foregoing fan drive gear systems, the apex is spaced aft of the midpoint of the axial width to direct more lubricant along the first ramp portion forward of the carrier than is directed along the second ramp portion aft of the carrier.

In a further embodiment of any of the foregoing fan drive gear systems, the system includes a flow splitter that is disposed within the channel for splitting lubricant between the first ramp portion and the second ramp portion. The flow splitter includes a splitter portion at the inlet and a support portion that extends radially within the channel from the splitter portion toward the first ramp portion and the second ramp portion.

In a further embodiment of any of the foregoing fan drive gear systems, the flow splitter is spaced apart from a midway point of an axial width of the channel such that incoming lubricant flow is unequally distributed forward and aft of the baffle.

In a further embodiment of any of the foregoing fan drive gear systems, the baffle includes a wedge that extends into a circumferential cavity between oppositely facing helical gear regions of the sun gear.

A turbofan engine according to an exemplary embodiment of this disclosure, among other possible things includes a fan section that is rotatable about an axis, a core engine section that is disposed about the axis, a primary lubrication system that includes a sump for gathering lubricant, an auxiliary lubrication system that is configured to supply a lubricant flow in the absence of lubricant flow from the primary lubricant system, and a fan drive gear system that is driven by the core engine section for rotating the fan about the axis. The fan drive gear system includes a sun gear rotatable about an axis. The sun gear includes a circumferential cavity that is disposed between a first gear region and a second gear region. A plurality of intermediate gears are driven by the sun gear. A baffle is disposed between at least two of the plurality of intermediate gears for defining a lubricant flow path from an interface between the sun gear and at least one of the plurality of intermediate gears. The baffle includes a channel with a first ramp portion that directs lubricant to the auxiliary lubrication system and a second ramp portion that directs lubricant toward the sump.

In a further embodiment of the foregoing turbofan engine, the engine includes a carrier that supports the intermediate gears and a ring gear that circumscribes the intermediate gears. The baffle is attached to the carrier and the carrier rotates about the axis.

In a further embodiment of any of the foregoing turbofan engines, the engine includes a forward gutter forward of the carrier and an aft gutter aft of the carrier. The first ramp portion directs lubricant toward the forward gutter and the second ramp directs lubricant toward the aft gutter and the forward gutter directs lubricant flow to the auxiliary lubrication system and the aft gutter directs lubricant flow to the sump.

In a further embodiment of any of the foregoing turbofan engines, the baffle directs more lubricant flow to the forward gutter and the auxiliary lubrication system than lubricant flow directed to the aft gutter and the sump.

In a further embodiment of any of the foregoing turbofan engines, an apex between the first ramp portion and the second ramp portion is disposed at a midpoint of an axial width to direct equal amounts of lubricant along the first ramp portion forward of the carrier and along the second ramp portion aft of the carrier.

In a further embodiment of any of the foregoing turbofan engines, the apex between the first ramp portion and the second ramp portion is spaced aft of a midpoint of an axial width to direct more lubricant along the first ramp portion forward of the carrier than is directed along the second ramp portion aft of the carrier.

In a further embodiment of any of the foregoing turbofan engines, the engine includes a flow splitter that is disposed within the channel for splitting lubricant between the first ramp portion and the second ramp portion. The flow splitter includes a splitter portion at an inlet and a support portion that extends radially within the channel from the splitter portion toward the first ramp portion and the second ramp portion.

In a further embodiment of any of the foregoing turbofan engines, the flow splitter is spaced apart from a midway point of an axial width of the channel such that incoming lubricant flow is unequally distributed forward and aft of the baffle.

In a further embodiment of any of the foregoing turbofan engines, the baffle includes a wedge that extends into a circumferential cavity between oppositely facing helical gear regions of the sun gear.

Although the different examples have the specific components shown in the illustrations, embodiments of this invention are not limited to those particular combinations. It is possible to use some of the components features from one of the several examples in alternate combinations with features from one or more of each of the examples to provide additional combinations.

These and other features disclosed herein can be best understood from the following specification and drawings, the following of which is a brief description.

BRIEF DESCRIPTION OF THE DRAWINGS

FIG. 8 is a partial sectional view of another example baffle.

FIG. 9 is a partial sectional view of yet another example baffle.

DETAILED DESCRIPTION

Figure 1:
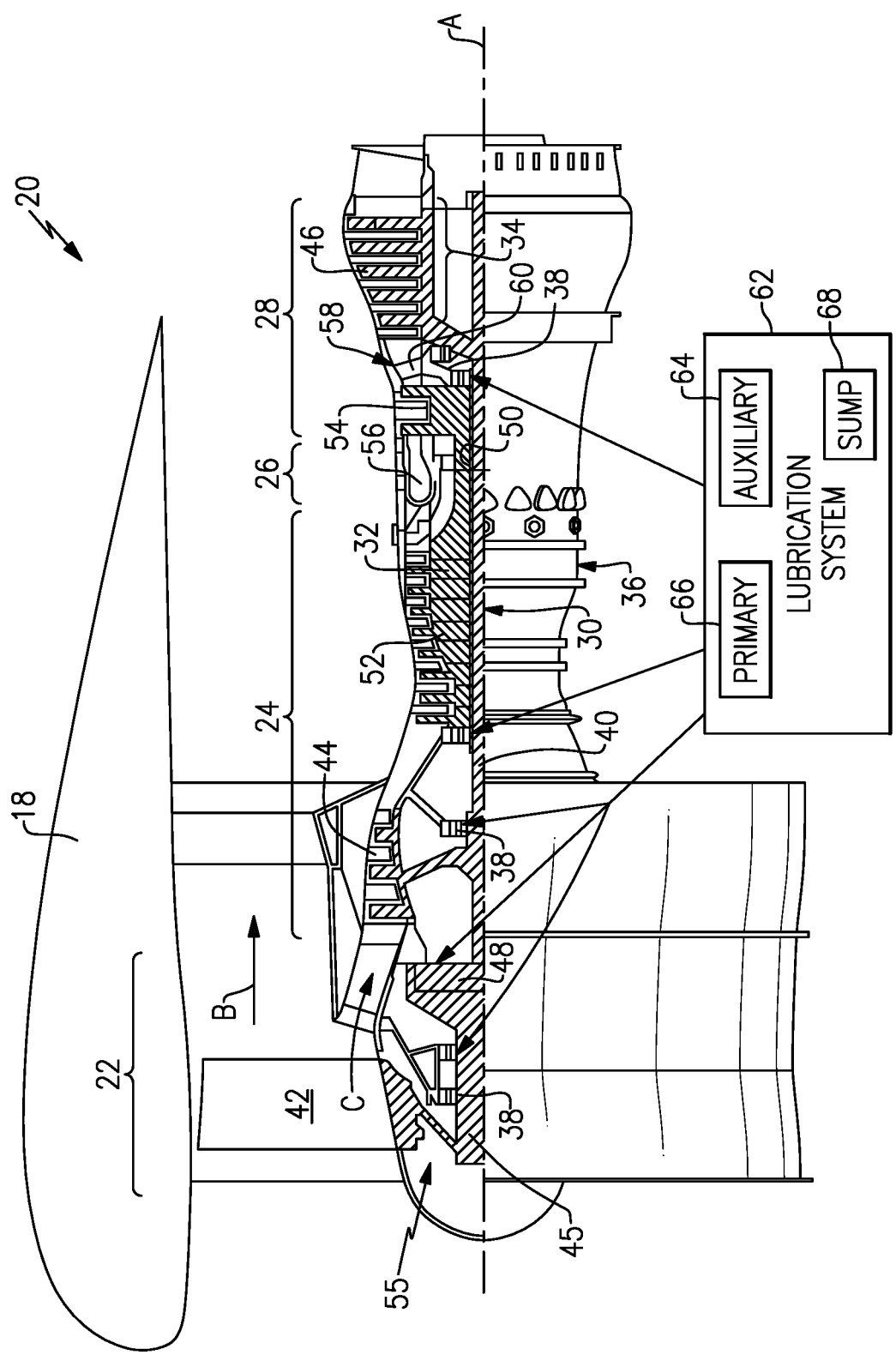
FIG. 1 is a schematic view of an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 18 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that additional bearing systems 38 may be provided, and that the location of the bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan section 22 through a speed change mechanism, which in exemplary gas turbine engine 20 is illustrated as a geared architecture 48 to drive the fan section 22 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 58 of the engine static structure 36 may be arranged generally between the high pressure turbine 54 and the low pressure turbine 46. The mid-turbine frame 58 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 58 includes airfoils 60 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and geared architecture 48 may be varied. For example, the geared architecture 48 may be located aft of the low pressure compressor, or aft of the combustor section 26 or even aft of turbine section 28, and fan 42 may be positioned forward or aft of the location of geared architecture 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 meters/second).

The example gas turbine engine includes the fan section 22 that comprises in one non-limiting embodiment less than about 26 fan blades 42. In another non-limiting embodiment, the fan section 22 includes less than about 20 fan blades 42. Moreover, in one disclosed embodiment the low pressure turbine 46 includes no more than about 6 turbine rotors schematically indicated at 34. In another non-limiting example embodiment, the low pressure turbine 46 includes about 3 turbine rotors. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades 42 in the fan section 22 disclose an example gas turbine engine 20 with increased power transfer efficiency.

The engine 20 includes a lubrication system 62 that provides lubricant to the geared architecture 48, the various bearing systems 38 as well as any other components that require lubricant flow. The lubrication system 62 includes a primary lubrication system 66 that normally provides lubricant to the geared architecture 48. The lubrication system 62 further includes an auxiliary lubrication system 64 that provides lubricant flow during conditions where the primary lubrication system 66 may not provide a desired amount of lubricant flow. Lubricant from the auxiliary lubrication system 64, the geared architecture 48 and the bearing systems 38 is eventually recovered in a sump 68 for recirculation by the primary lubrication system 66.

Figure 2:
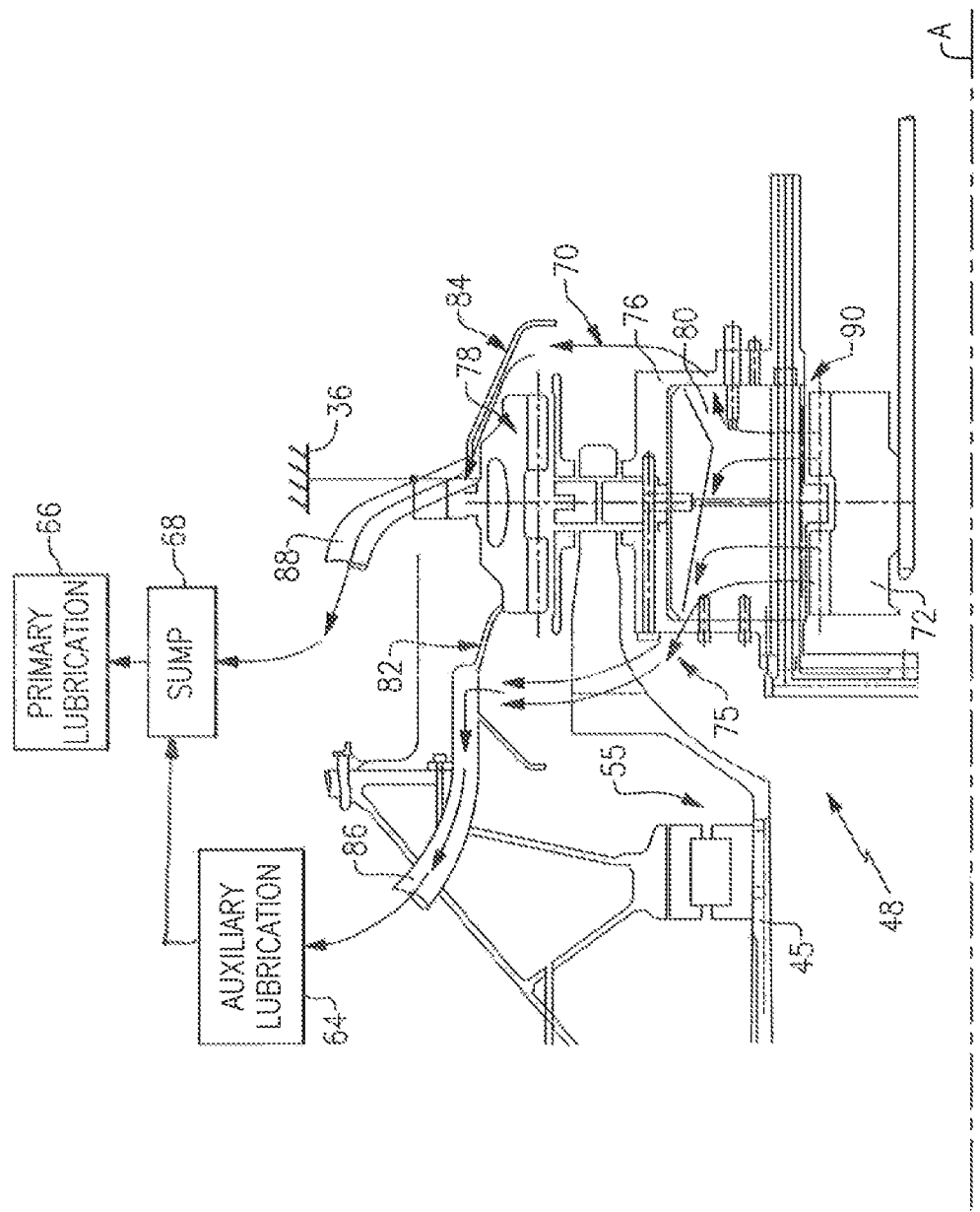
FIG. 2 is a schematic view of an example fan drive gear system for a gas turbine engine.
Figure 3:
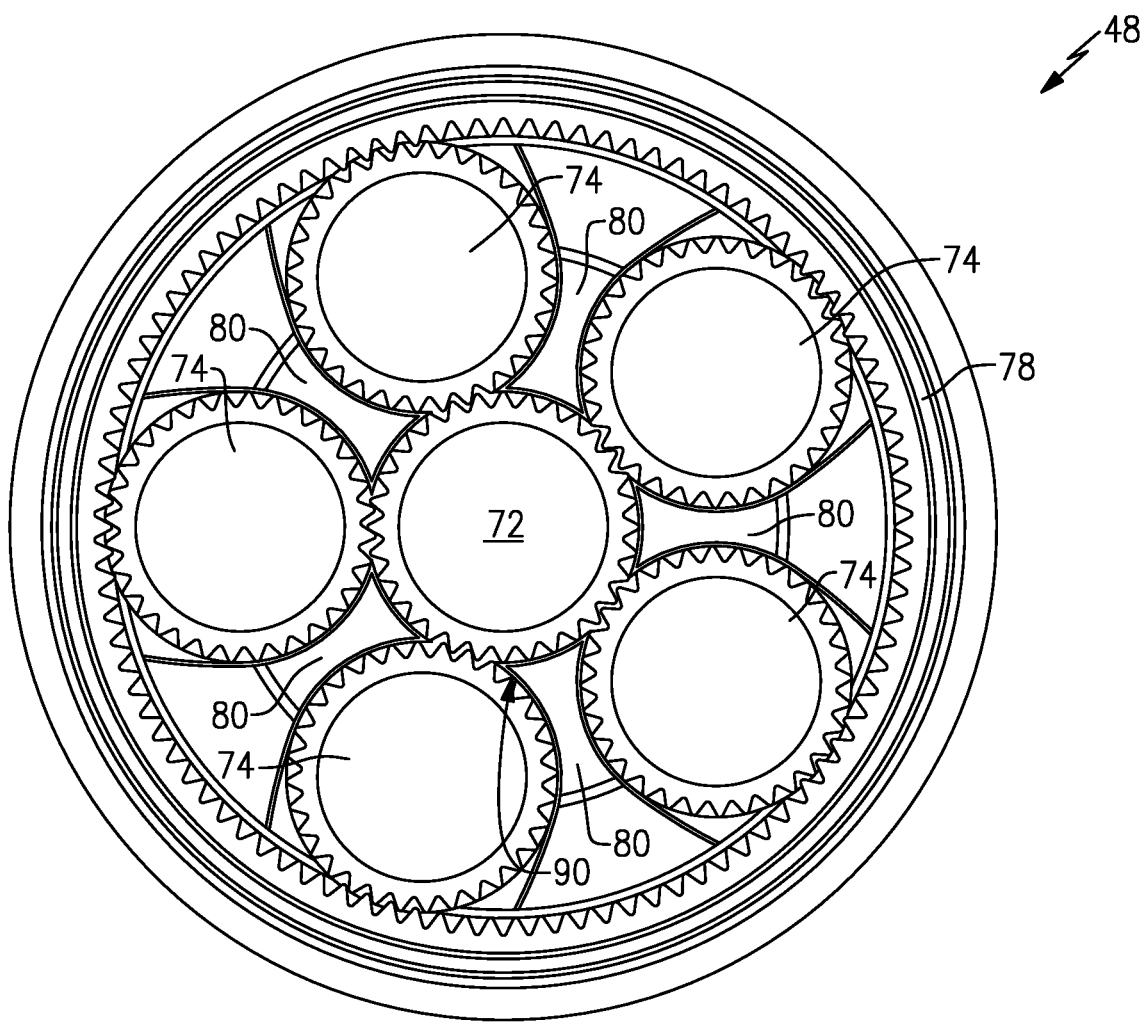
FIG. 3 is a schematic view of an example geared architecture.
Figure 4:
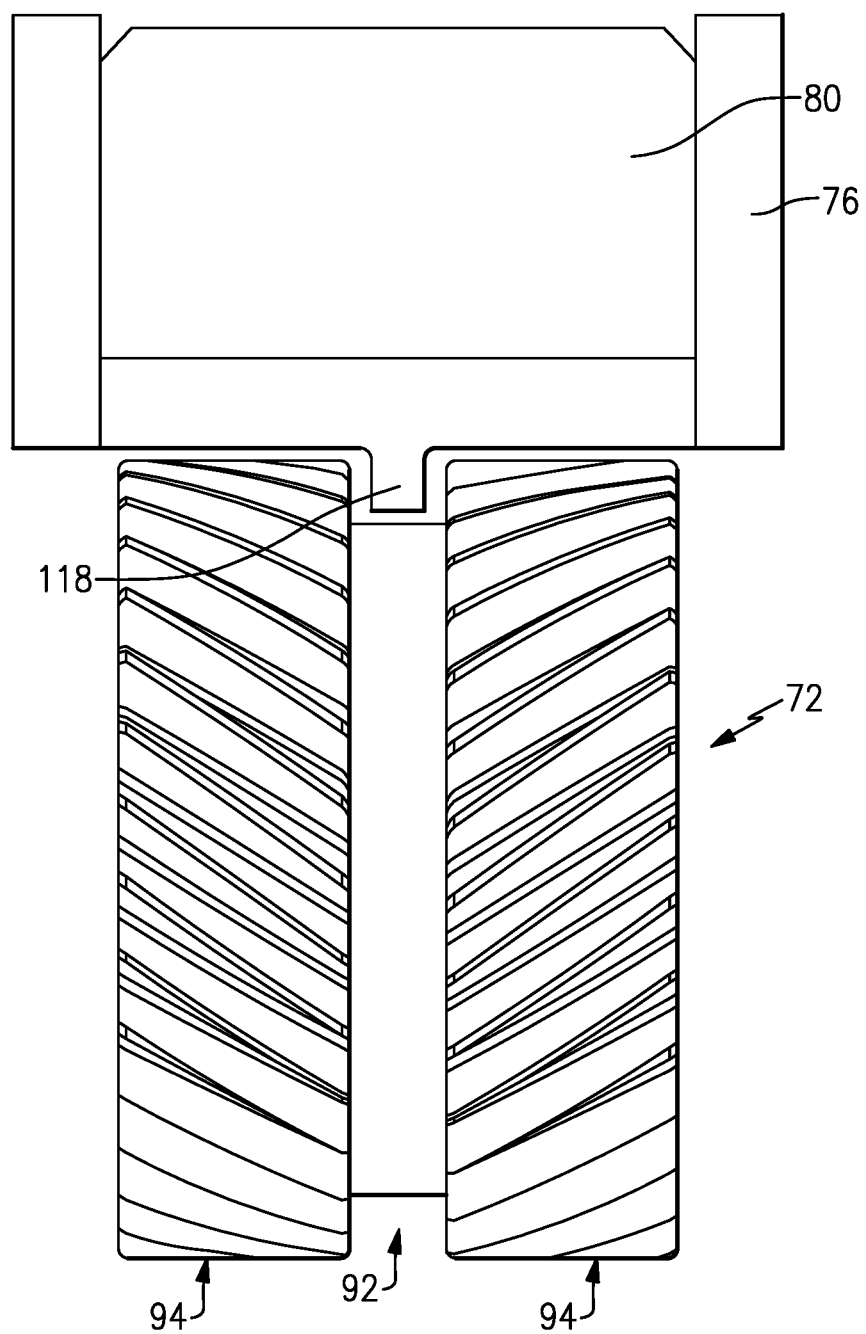
FIG. 4 is a schematic view of a portion of a geared architecture.

Referring to FIGS. 2, 3 and 4 with continued reference to FIG. 1, the geared architecture 48 is part of a fan drive gear system 55 that drives the fan 22. Lubricant within the geared architecture 48 is directed into gear mesh interfaces 90 and then guided out by baffles 80. From the baffles 80 lubricant is directed to either the auxiliary lubrication system 62 or the back to the sump of the primary lubrication system. The baffles 80 provide a flow split of lubricant expelled from the gear system 48 to prevent overflow of lubricant flow to the auxiliary system 64 and thereby reduce some of the windage and churning losses that reduce gear efficiency. The baffles are further provided to direct exhaust lubrication flow through and away from the geared architecture with minimal windage and churning losses.

The example geared architecture 48 includes a sun gear 72 that drives and is in meshed engagement with a plurality of intermediate gears 74. The intermediate gears 74 are often referred to as either star gears or planet gears. Star gears rotate about fixed axes, whereas planet gears are supported on axes that rotate about the sun gear 72. In this example, the intermediate gears 74 are referred to as planet gears 74 and are supported by a carrier assembly 76. The carrier assembly 76 and the planet gears 74 rotate about the axis A to drive a fan drive shaft 45. A ring gear 78 circumscribes the plurality of planet gears 74 and is in meshing engagement with each of the planet gears 74. The ring gear 78 is fixed to a portion of the engine static structure 36. A baffle 80 is disposed between each of the planet gears 74 proximate the meshing engagement 90 with the sun gear 72.

The example sun gear 72 includes a circumferential cavity 92 between two gear portions 94. The baffle 80 includes a scoop 118 that extends into the circumferential cavity 92. The baffle 80 is secured to inner sides of the carrier 76 proximate the gear mesh interface 90 between the planet gears 74 and the sun gear 72. In one example embodiment, the gear portions 94 are opposing helical gears. However, other gear configurations are within the scope and contemplation of this disclosure.

Rotation of the carrier 76 generates centrifugal forces that drive lubricant exiting the geared architecture 48 radially outward away from axis A. The centrifugal forces are utilized to drive a first portion of exhausted lubricant 70 through passages 88 to the sump 68. Lubricant in the sump 68 is recirculated back to the primary lubrication system 66.

A second portion of exhausted lubricant 75 is directed into passages 86 to the auxiliary lubrication system 64. The baffle 80 directs the first portion of the exhausted lubricant flow 70 axially aft into an aft gutter 84 and the second portion of the exhausted lubricant flow 75 axially forward into a forward gutter 82. The forward gutter 82 captures the exhausted lubricant 75 and directs it into passages 86 to the auxiliary lubrication system 64. The aft gutter 84 captures exhausted lubricant 70 and directs the lubricant through passages 88 into the sump 68. The relative positions of the auxiliary lubrication system 64 and the sump 68 are an example embodiment and other relative positions of auxiliary lubrication system 64 and the sump could be utilized and are within the scope and contemplation of this disclosure. For example, the forward gutter 82 may direct the exhausted lubricant axially forward to the sump 68, and the aft gutter 84 may direct the exhausted lubricant aft to the auxiliary lubrication system 64.

The terms axial, radial, forward and aft are utilized throughout this disclosure to denote relative positon of components. The term axial refers to a direction that is substantially parallel to the engine longitudinal axis A. The term radial refers to a direction that is substantially transverse to the engine longitudinal axis. The term forward generally is used to describe a position or direction that is toward the fan section 22 of the engine 20. Similarly, the term aft is generally used to describe a position or direction that is toward the turbine section 28 of the engine 20.

In one disclosed embodiment, the second portion of the lubricant flow 75 directed to the auxiliary lubrication system 64 is more than the first portion of lubricant flow 70 directed toward the sump. Accordingly, the first portion of lubricant flow 70 is not equal to the second portion of lubricant flow 75. The baffle 80 controls the split of lubricant flow 70, 75 forward and aft of the geared architecture 48. Excess flow directed to the auxiliary lubrication system 64 can create windage and churning losses that can reduce overall gearbox operating efficiencies. Further, the shape and position of the baffle 80 can create windage and churning losses reducing gearbox efficiency.

The baffle 80 includes features for proportioning exhaust lubricant flows 70, 75 to maintain a supply in the auxiliary lubrication system 64 without providing excess flow or generating windage or churning losses. In one disclosed embodiment, approximately 80% of lubricant exhausted from the geared architecture 48 is routed to the auxiliary lubrication system 64 by the baffle 80. In another disclosed embodiment, more than 50% of lubricant exhausted from the geared architecture 48 is routed to the auxiliary lubrication system 64 by the baffle 80. In another disclosed embodiment, lubricant flow is split evenly between the auxiliary system 64 and the sump 68. Additionally, it is also within the contemplation of this disclosure to direct all lubricant flow either forward or aft to one of the auxiliary lubrication system 64 and the sump 68.

Figure 5:
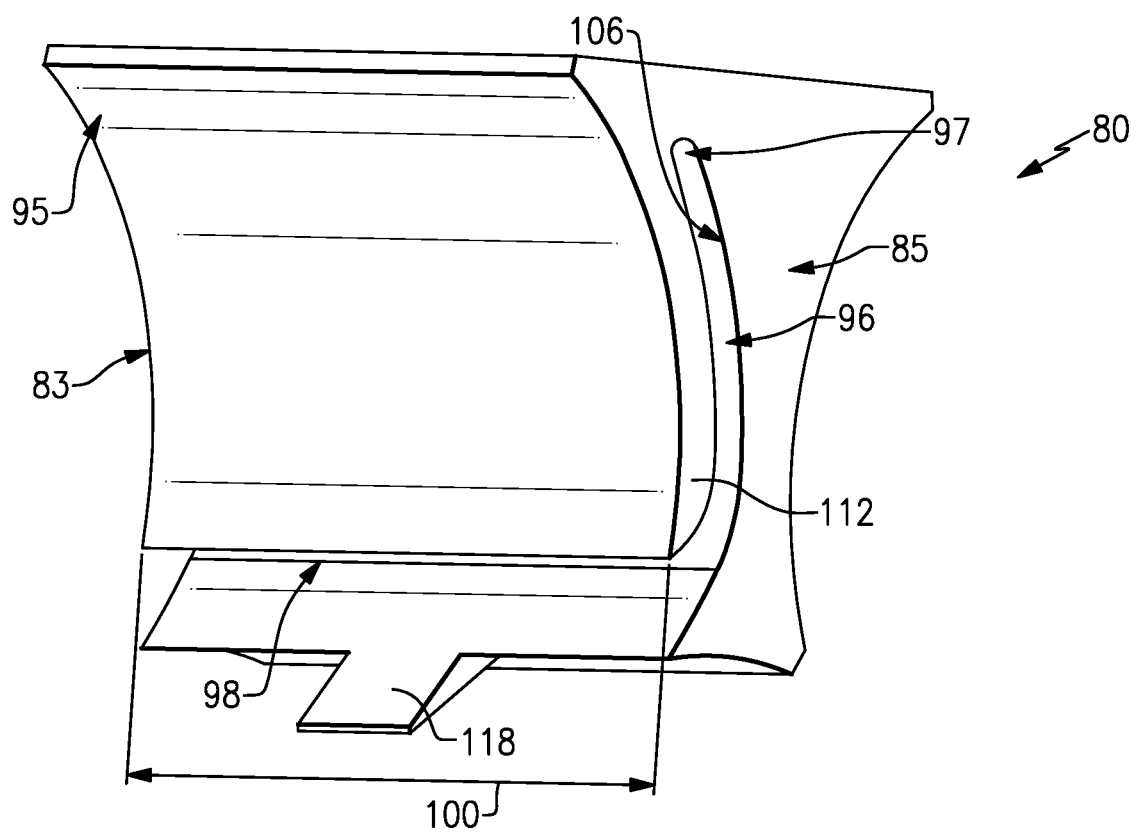
FIG. 5 is a perspective view of an example baffle.
Figure 7:
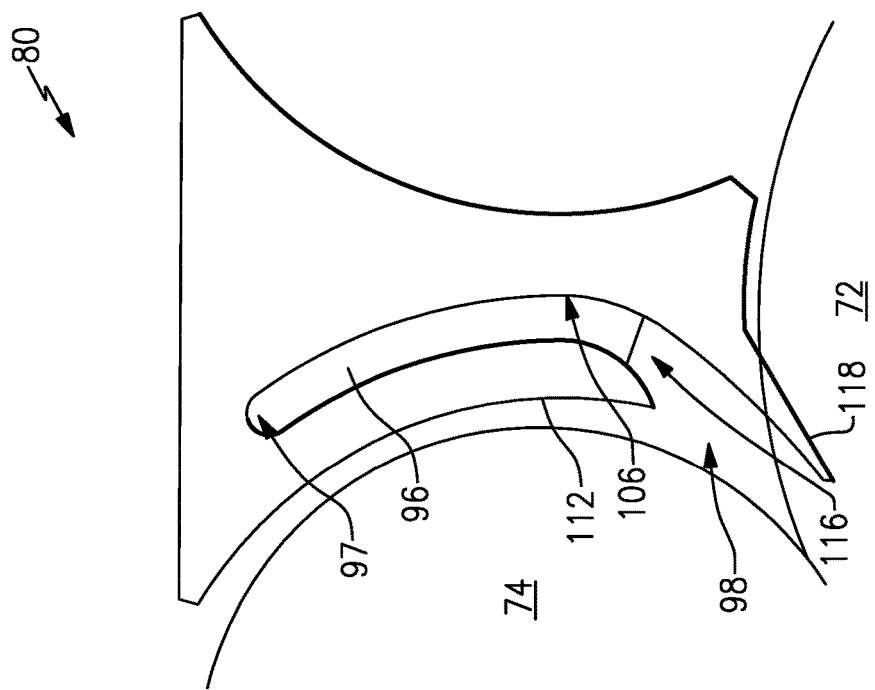
FIG. 7 is a side view of the example baffle.
Figure 6:
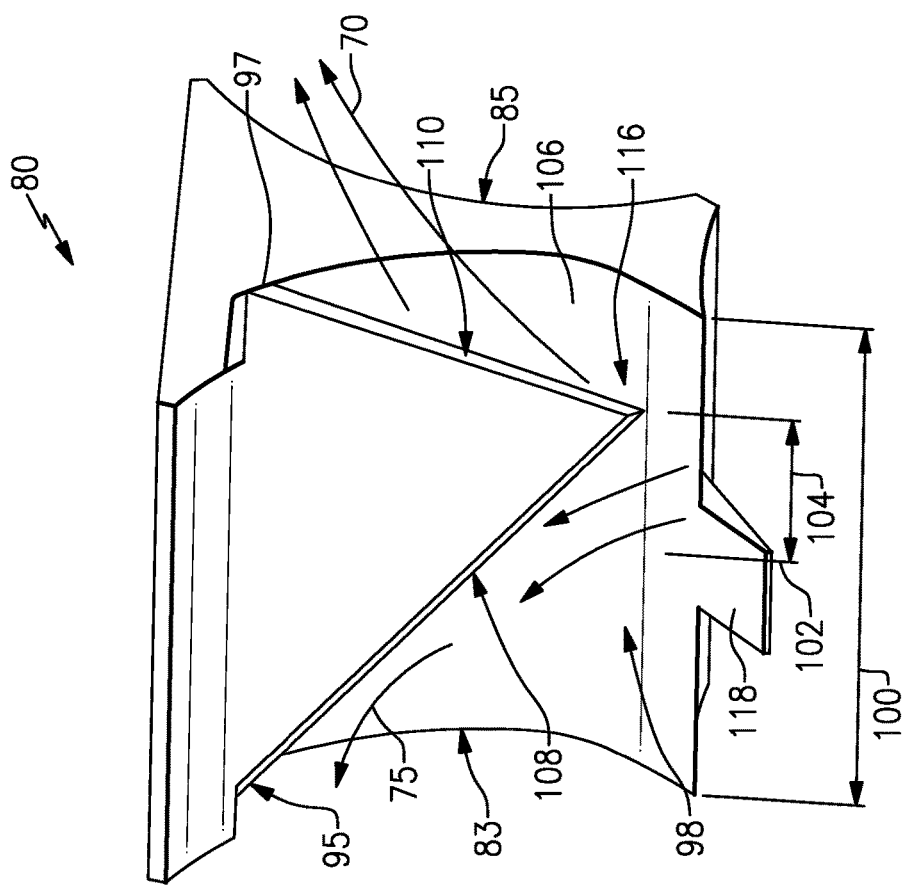
FIG. 6 is a partial sectional view of the example baffle.

Referring to FIGS. 5, 6, and 7 with continued reference to FIG. 2, the example baffle 80 includes a channel 96 defined between an outer wall 112 and a back wall 106. FIG. 6 illustrates the example baffle 80 with the outer wall 112 removed to show the ramp portions 108 and 110 within channel 96. The channel 96 extends radially outward from an inlet 98 to a forward end 95 on a forward side 83 of the baffle 80 and to an aft end 97 on an aft side 85 of the baffle 80. The channel 96 includes a first ramp portion 108 that directs lubricant from the inlet 98 toward the forward end 95. A second ramp portion 110 directs lubricant flow toward the aft end 97. The first ramp portion 108 and the second ramp portion 110 meet at an apex 116 near the inlet 98. The apex 116 splits lubricant flow entering the inlet 98 such that it flows toward one of the forward end 95 and the aft end 97 of the channel 96.

The baffle 80 includes a width 100 between a forward side 83 and an aft side 85. The scoop 118 is disposed at a midpoint 102 equally spaced between the sides 83, 85. The apex 116 is spaced apart from the midpoint 102 a distance 104 such that it is offset from the midpoint 102. In one disclosed embodiment, the distance 104 extends aft from the midpoint 102. The location of the apex 116 defines and proportions the amount of lubricant that is routed to each of the forward and aft ends 95, 97. In this disclosed embodiment, the location of the apex 116 offset toward the aft side 85 to provide more lubricant flow forward along the first ramp portion 108. As appreciated, the apex 116 location may be adjusted to tailor a desired split of exhausted lubricant forward and aft of the geared architecture.

The first and second ramp portions 108, 110 extend across the entire channel 96 between the outer wall 112 and the back wall 106. The first ramp portion 108 and the second ramp portion 110 are disposed near the inlet to minimize directional changes in lubricant flow. Directional changes in lubricant flow impart work on the lubricant flow that can create windage and churning, and heat the lubricant.

The outer wall 112 is curved to correspond with a curvature of the corresponding planet gear 74. The channel 96 includes a curvature that corresponds to the outer wall 112 and the planet gear 74. It should be appreciated, that other curvatures and shapes could be utilized to provide a desired lubricant flow and are within the scope and contemplation of this disclosure. The example baffle 80 is disclosed as a single integral part, but may be fabricated and formed in several different parts.

Referring to FIG. 8, another example baffle 150 is shown with the outer wall 112 removed to show another example ramp portion 152 within a channel 155. The channel 155 has a height 105 and a width 100. The ramp portion 152 begins at the inlet 98 and extends to the forward end 95 to direct all lubricant toward the forward end 95. The ramp portion 152 is a continuous surface that extends the full width 100 of the baffle 150 from an aft most point 154 at the inlet 98 to a forward most point 156 that is radially outward of the inlet 98. In this example, the aft most point 154 is also the apex of the ramp portion 152. An angle 158 of the ramp portion 152 from a line radial plane extending from the engine longitudinal axis A is dependent on the width 100 and the radial height 105 of the channel 155. In one example embodiment, the angle 158 is between about 30° and 60°. In another disclosed embodiment, the angle 158 is about 45°.

Referring to FIG. 9, another example baffle 160 is shown with the outer wall 112 removed to show example ramp portions 162A and 162B within a channel 165. The ramp portions 162A and 162B begin at an apex 164 at the inlet 98 and diverge to opposite sides of the baffle 160. The apex 164 is positioned at the midpoint 102 of the width 100 such that lubricant flow is directed evenly toward the forward point 168 and an aft point 166. An angle 170 between the ramp portions 162A and 162B is dependent on the width 100 baffle and the radial height 105 of the channel 165. In one disclosed embodiment, the angle 170 is between 45° and 75°. In another disclosed embodiment, the angle 170 is about 60°.

Figure 10:
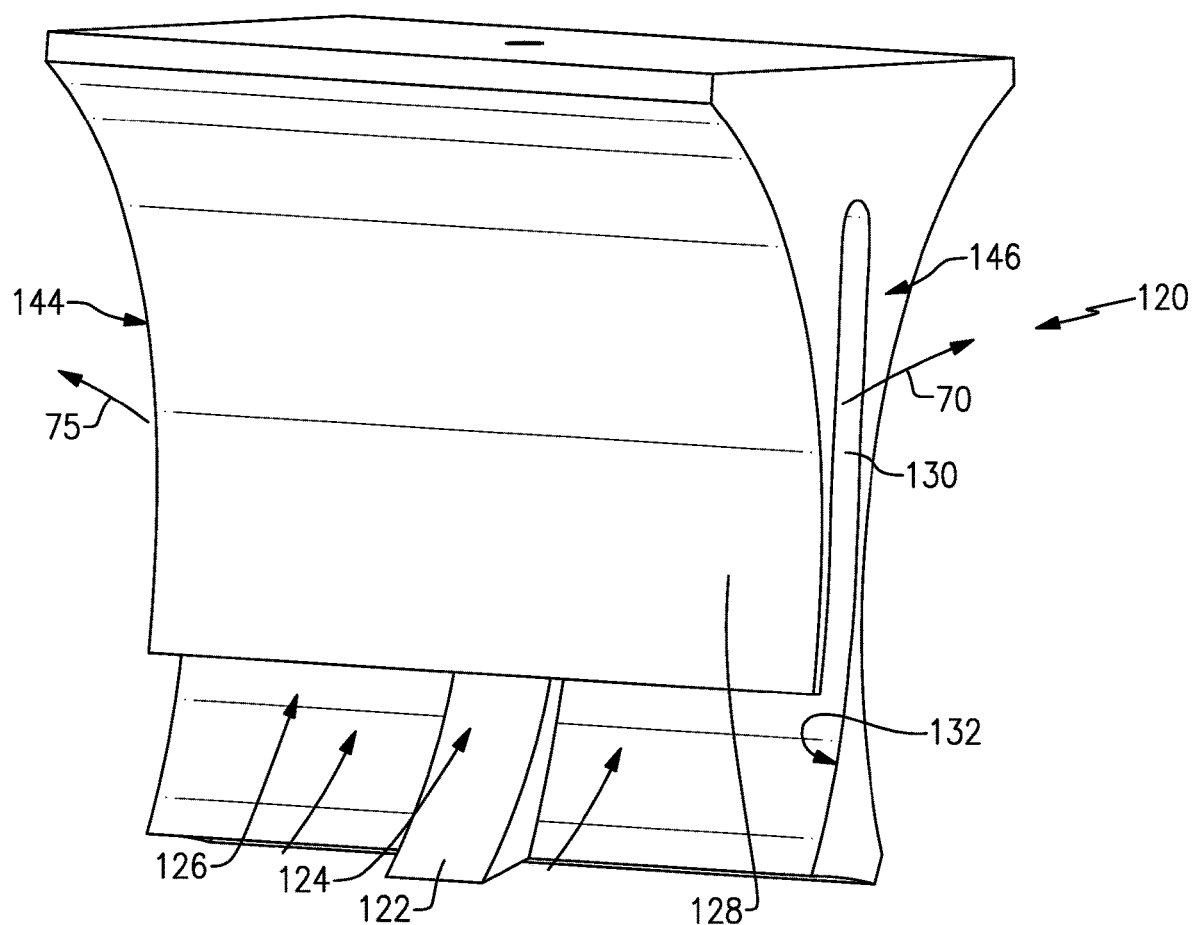
FIG. 10 is a perspective view of another example baffle.
Figure 12:
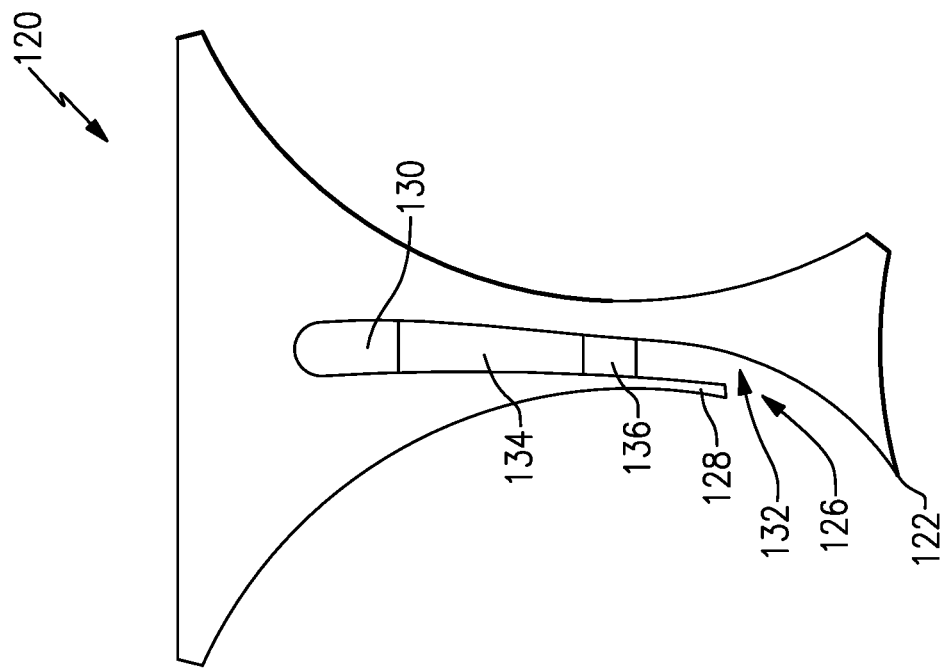
FIG. 12 is a side view of the example baffle of FIG. 10.
Figure 11:
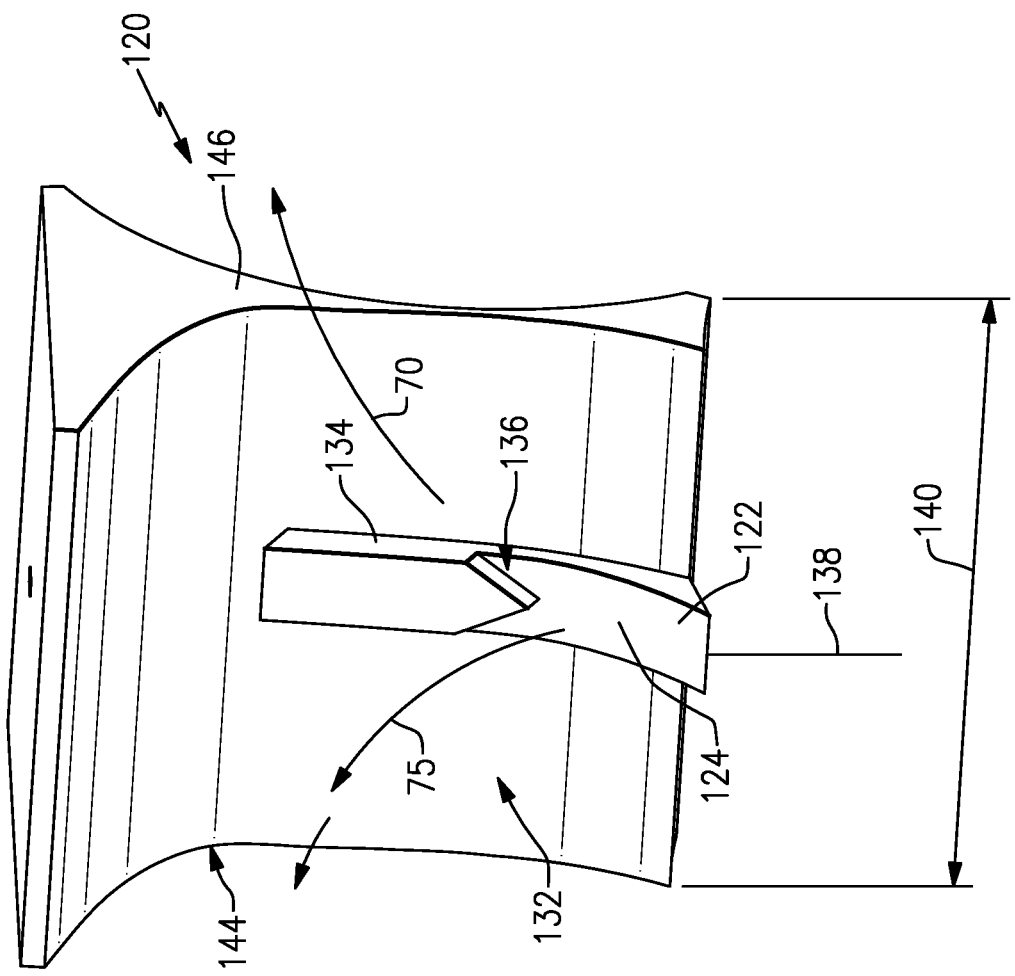
FIG. 11 is a partial sectional view of the example baffle of FIG. 10.

Referring to FIGS. 10, 11, and 12, another example baffle 120 is shown and includes a flow splitter 124 dividing exhausted lubricant flow. FIG. 11 is shown without a forward wall 128 to show the flow splitter 124 more clearly. The flow splitter 124 extends radially upward from a scoop 122 through inlet 126 and into a channel 130. The flow splitter 124 includes a splitter portion 136 and a support portion 134. The splitter portion 136 directs flow toward the forward side 144 and aft toward the aft side 146 of the baffle 120. The example flow splitter 124 is disposed at a midpoint 138 of a width 140 of the baffle 120 and therefore evenly splits lubricant flow toward forward side 144 and an aft side 146.

The baffle 120 includes a forward wall 128 and a back wall 132. The channel 130 is defined between the forward and back walls 128, 132. The forward wall 128 may be partially supported by the support portion 134 of the flow splitter 124. The support portion 134 extends from the back wall 132 to the forward wall 128. The support portion 134 may be an integral portion of the baffle 120 and define a rib that provides support for the forward wall 128.

Figure 13:
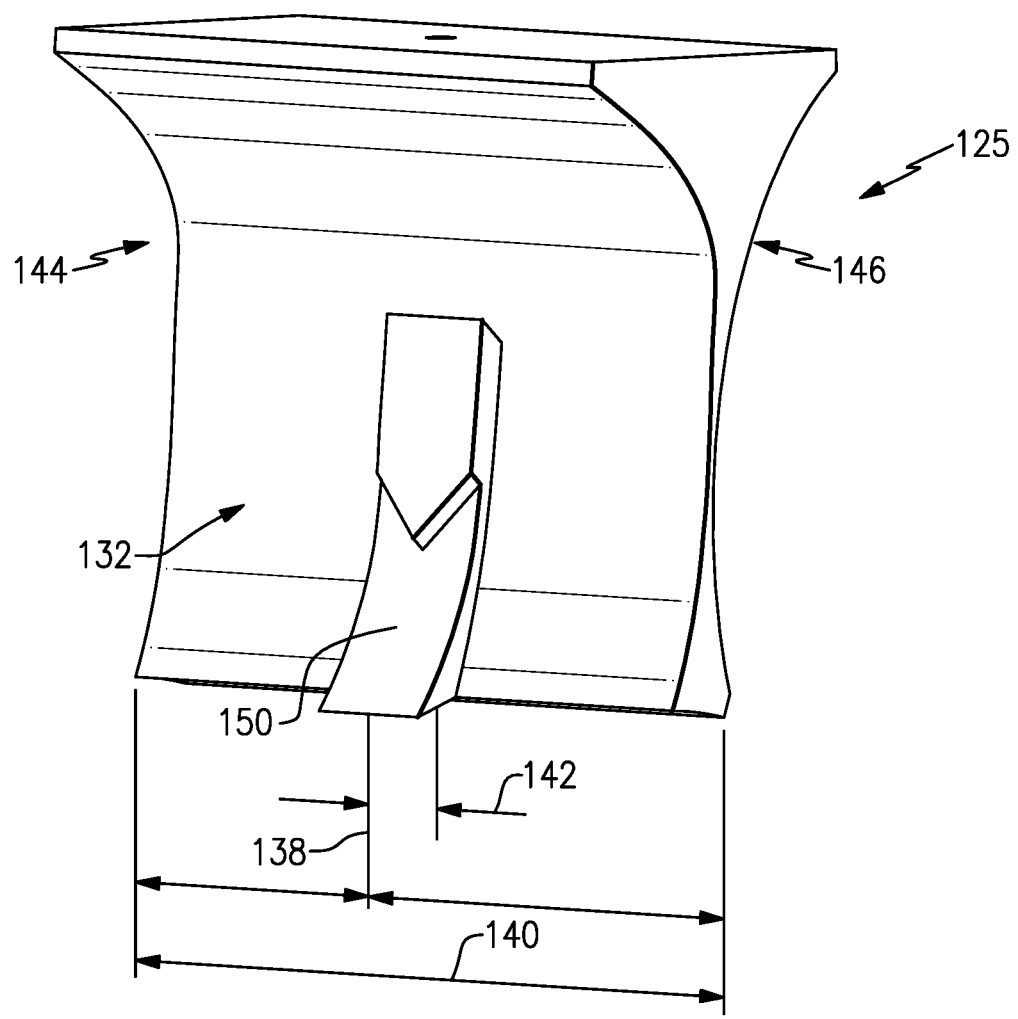
FIG. 13 is a partial sectional view of yet another example baffle.

Referring to FIG. 13, another disclosed baffle 125 includes a flow splitter 150 that is spaced a distance 142 apart from the midpoint 138. FIG. 13 is shown without the forward wall to enable a clear view of the flow splitter 150. The spaced distance 142 from the midpoint 138 provides for an unequal split in lubricant flow between the forward side 144 and the aft side 146. In one disclosed embodiment, the location of the splitter 150 provides 80% of exhausted lubricant flow toward the forward side with the remainder of lubricant low being directed aft. In another embodiment, the flow splitter 150 is disposed to provide more than 50% of lubricant flow forward and less than 50% aft. It should be appreciated, that the location of the flow splitter 150 may be arranged to proportion exhausted lubricant flow as desired for a specific application and such other positons are within the contemplation and scope of this disclosure.

The disclosed baffles provide for the distribution of exhaust lubricant flow between forward and aft sides of the geared architecture. Distribution of the exhaust lubricant flows are proportioned to efficiently allocate lubricant flow between the auxiliary lubrication system and the sump of the primary lubrication system.

Although example embodiments have been described, a worker of ordinary skill in this art would recognize that certain modifications would come within the scope of this disclosure. For that reason, the following claims should be studied to determine the scope and content of this disclosure.

What is claimed is:

1. A fan drive gear system for a turbofan engine comprising:
 a sun gear rotatable about an axis;
 a plurality of intermediate gears driven by the sun gear; and
 a baffle disposed between at least two of the plurality of intermediate gears for defining a lubricant flow path from an interface between the sun gear and at least one of the plurality of intermediate gears, the baffle including a channel with a first ramp portion and a second ramp portion configured for directing lubricant and a flow splitter disposed within the channel for splitting lubricant between the first ramp portion and the second ramp portion, wherein the flow splitter is spaced apart from a midway point of an axial width of the channel such that incoming lubricant flow is unequally distributed forward and aft of the baffle.

2. The fan drive gear system as recited in claim 1, wherein the first ramp portion directs lubricant forward and the second ramp portion directs lubricant aft.

3. The fan drive gear system as recited in claim 2, including a carrier supporting the intermediate gears and a ring gear circumscribing the intermediate gears, wherein the baffle is attached to the carrier and the carrier rotates about the axis.

4. The fan drive gear system as recited in claim 3, including a forward gutter forward of the carrier and an aft gutter aft of the carrier, wherein the first ramp portion directs lubricant toward the forward gutter and the second ramp portion directs lubricant toward the aft gutter.

5. The fan drive gear system as recited in claim 4, wherein the baffle includes an inlet opening into the channel, the inlet disposed radially inward of the first ramp portion and the second ramp portion.

6. The fan drive gear system as recited in claim 5, wherein the flow splitter includes a splitter portion at the inlet and a support portion extending radially within the channel from the splitter portion toward the first ramp portion and the second ramp portion.

7. The fan drive gear system as recited in claim 1, wherein the baffle includes a wedge extending into a circumferential cavity between oppositely facing helical gear regions of the sun gear.

8. A turbofan engine comprising:
 a fan section rotatable about an axis;
 a core engine section disposed about the axis;
 a primary lubrication system including a sump for gathering lubricant;
 an auxiliary lubrication system configured to supply a lubricant flow in an absence of a lubricant flow from the primary lubrication system;
 a fan drive gear system driven by the core engine section for rotating fan of the fan section about the axis, the fan drive gear system including:
  a sun gear rotatable about the axis, the sun gear including a circumferential cavity disposed between a first gear region and a second gear region;
  a plurality of intermediate gears driven by the sun gear;
  a baffle disposed between at least two of the plurality of intermediate gears for defining a lubricant flow path from an interface between the sun gear and at least one of the plurality of intermediate gears, the baffle including a channel with a first ramp portion directing lubricant to the auxiliary lubrication system, a second ramp portion directing lubricant toward the sump and a flow splitter disposed within the channel for splitting lubricant between the first ramp portion and the second ramp portion, wherein the flow splitter is spaced apart from a midway point of an axial width of the channel such that incoming lubricant flow is unequally distributed between the auxiliary lubrication system and the sump.

9. The turbofan engine as recited in claim 8, including a carrier supporting the intermediate gears and a ring gear circumscribing the intermediate gears, wherein the baffle is attached to the carrier and the carrier rotates about the axis.

10. The turbofan engine as recited in claim 9, including a forward gutter forward of the carrier and an aft gutter aft of the carrier, wherein the first ramp portion directs lubricant toward the forward gutter and the second ramp portion directs lubricant toward the aft gutter and the forward gutter directs lubricant to the auxiliary lubrication system and the aft gutter directs lubricant to the sump.

11. The turbofan engine as recited in claim 10, wherein the baffle directs more lubricant to the forward gutter and the auxiliary lubrication system than lubricant directed to the aft gutter and the sump.

12. The turbofan engine as recited in claim 8, wherein the baffle includes a wedge extending into the circumferential cavity.

* * * * *